(12) United States Patent
Chandrasekaran

(10) Patent No.: US 11,917,480 B2
(45) Date of Patent: Feb. 27, 2024

(54) TRAFFIC MANAGEMENT FOR WIRELESS COMMUNICATION NETWORK

(71) Applicant: T-Mobile USA, Inc., Bellevue, WA (US)

(72) Inventor: Nirmal Chandrasekaran, West New York, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/188,675

(22) Filed: Jun. 21, 2016

(65) Prior Publication Data

US 2017/0367022 A1    Dec. 21, 2017

(51) Int. Cl.
*H04W 36/22* (2009.01)
*H04W 28/02* (2009.01)
*H04W 24/10* (2009.01)

(52) U.S. Cl.
CPC ....... *H04W 36/22* (2013.01); *H04W 28/0284* (2013.01); *H04W 28/0289* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 9,014,040 B1* | 4/2015 | Naim | ................ | H04W 28/0236 370/332 |
| 9,204,346 B1* | 12/2015 | Pawar | ................... | H04W 24/02 |
| 9,408,118 B2 | 8/2016 | Karimli et al. | | |
| 9,408,180 B2 | 8/2016 | Karimli et al. | | |
| 10,194,354 B1* | 1/2019 | Zhou | ..................... | H04W 36/22 |
| 2004/0053574 A1* | 3/2004 | Klein | .................. | H04W 52/288 455/67.11 |
| 2004/0120286 A1* | 6/2004 | Schwarz | ............... | H04W 36/22 370/331 |
| 2012/0120800 A1* | 5/2012 | Lientz | ................... | H04L 67/563 370/235 |
| 2012/0147765 A1* | 6/2012 | Wigren | ............... | H04W 52/343 370/252 |
| 2012/0198020 A1* | 8/2012 | Parker | ..................... | H04L 65/80 709/217 |
| 2014/0349647 A1* | 11/2014 | Chen | ..................... | H04W 36/30 455/436 |
| 2014/0378132 A1* | 12/2014 | Budhwani | ............. | H04W 48/16 455/435.1 |
| 2015/0011227 A1* | 1/2015 | Wellington | ........... | H04W 24/02 455/446 |
| 2015/0087325 A1* | 3/2015 | Nuss | ................. | H04W 28/0247 455/453 |
| 2015/0126193 A1* | 5/2015 | Huang | .................. | H04W 36/22 455/436 |

(Continued)

*Primary Examiner* — Jason E Mattis
*Assistant Examiner* — Bao G Nguyen
(74) *Attorney, Agent, or Firm* — Lee & Hayes, P.C.

(57) ABSTRACT

Systems and methods for managing telecommunication traffic for a wireless communication network associated with multiple coverage areas ("cells") are disclosed. The system may detect congested cells of the wireless communication network, identify suitable neighboring cells for offloading traffic from the congested cells, and implementing handovers from congested cells to suitable neighbor cells to balance the wireless communication network traffic.

18 Claims, 4 Drawing Sheets

(56) References Cited

U.S. PATENT DOCUMENTS

| | | | |
|---|---|---|---|
| 2015/0341839 A1* | 11/2015 | Kim | H04W 84/045 |
| | | | 370/331 |
| 2016/0157126 A1* | 6/2016 | Nuss | H04W 72/0486 |
| | | | 370/230 |
| 2016/0302109 A1* | 10/2016 | Curran | H04W 36/30 |
| 2017/0257857 A1* | 9/2017 | Chaudhuri | H04W 76/14 |
| 2017/0367022 A1* | 12/2017 | Chandrasekaran | H04W 36/22 |

* cited by examiner though they might both have overlapping coverage.

TRAFFIC MANAGEMENT FOR WIRELESS COMMUNICATION NETWORK

BACKGROUND

A wireless communication network (e.g., cellular network) is typically formed between a plurality of telecommunication devices, often referred to user equipment ("UE"), and a network of stationary infrastructure equipment, often referred to as "base stations" or "node Bs" each capable of serving one or more coverage areas (e.g., cells or sectors). Generally described, a telecommunication services provider will distribute individual infrastructure equipment throughout a geographic area such that coverage areas of the individual infrastructure equipment overlap. A telecommunication device within the coverage area of one or more infrastructure equipment can communicate over the wireless communication network.

Telecommunication devices are typically configured to connect to a specific infrastructure equipment within a wireless communication network. For example, when a telecommunication device is activated or turned on, it attempts to connect to infrastructure equipment and register to a coverage area of the infrastructure equipment. In many instances, users of telecommunication devices are mobile. As such, the signal strength received by a telecommunication device may vary greatly depending on factors, such as rate of movement, geographic barriers, etc. Because most wireless communication networks can provide overlapping coverage areas for the infrastructure structure equipment, most wireless communication protocols facilitate a handover procedure in which a telecommunication device is capable of connecting to a different infrastructure equipment without losing an existing communication channel/connection.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
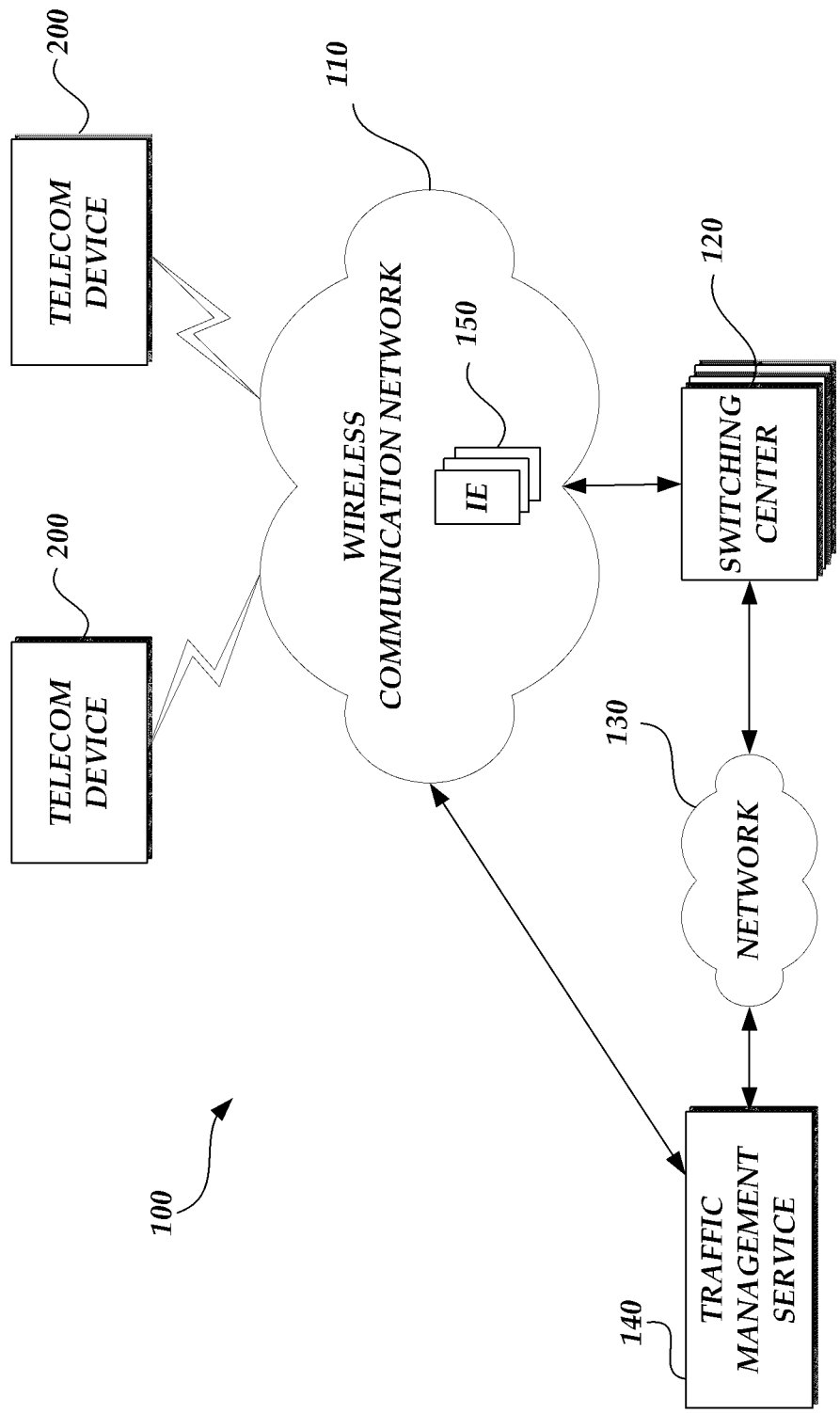
FIG. 1 is a block diagram depicting an illustrative telecommunication environment.

Generally described the present disclosure relates to telecommunication traffic management for a wireless communication network. More specifically, aspects of the present application correspond to traffic balancing among coverage areas (generally referred to as "cells") associated with different infrastructure equipment. Illustratively, a traffic management service may detect congested cells of the wireless communication network, identify suitable neighboring cells for offloading traffic from the congested cells, and implementing handovers from congested cells to suitable neighbor cells to balance the wireless communication network traffic.

In a wireless communication network, infrastructure equipment may be configured such that cells associated with different infrastructure equipment may be either standardized or vary in size, signal strength, data rate, network type, etc. When the cells of individual infrastructure equipment overlap geographically, it may be possible for a telecommunication device to attempt to establish a communication channel via any cell covering the location of the telecommunication device. A telecommunication device may, by default, attempt to establish communication via a cell that has better signal strength, smaller cell size, more advanced network type, etc., when compared to other available cells. However, the capacity of individual infrastructure equipment to serve a corresponding cell (generally referred to as "cell capacity") is limited by computing resources, network bandwidth, energy consumption, geographic barriers, and other factors. Accordingly, when the aggregate number, functionality, or bandwidth of telecommunication devices in a particular cell exceeds a capacity threshold, the cell becomes congested (e.g., high rate of dropped phone calls, deteriorated audio quality, slow data communication speed, or other inferior quality of service may occur).

In accordance with an illustrative embodiment, a traffic management service associated with a provider of the wireless communication network may simultaneously collect cell performance data (e.g., number of connected devices, data downloading volume or speed, communication throughput, percentage of resource utilization, or the like) related to various cells of the wireless communication network in real time or substantially real time (e.g., within a small threshold of delay in time). The traffic management service determines capacity status of the cells based on the cell performance data, and may further identify congested cells based on the determined capacity status.

Once the congested cells are identified, the traffic management service may further identify neighboring cells that have at least some overlapping coverage with the congested cell. The traffic management service may analyze recent data of handovers involving the congested cells to identify these neighboring cells for each congested cell. The traffic management service may further analyze the capacity status of neighboring cells for each congested cell and identify one or more target cells, which have sufficient capacity for offloading traffic from corresponding congested cells. The traffic management service then implements or causes handovers of active communication channels from the congested cell(s) to the target cell(s) by sending requests to telecommunication devices, infrastructure equipment, or modifying mobility parameters or protocols associated with the wireless communication network. By continuously implementing the traffic management routines and related functionalities disclosed herein, the traffic management service may cause communication traffic from telecommunication devices to conform or converge to a uniform distribution among cells within at least some portion of the wireless network.

Although aspects of the present disclosure will be described with regard to an illustrative telecommunication environment and component interactions, communication protocols, flow diagrams and user interfaces, one skilled in the relevant art will appreciate that the disclosed embodiments are illustrative in nature and should not be construed as limiting. Specifically, although the term telecommunication device is used in this document, the term represents any type of device having a component for communicating with one or more other devices via one or more communication paths. Such communication paths can include wireless communication paths (via infra-red, RF, optical, terrestrial, or satellite communication media) and wired communication paths. Additionally, although the present disclosure references a telecommunication device, one skilled in the relevant art will appreciate that a telecommunication device may also be referred to as a wireless computing device, a mobile communication device, a mobile device, or a computing device. Examples of telecommunication networks and devices are described below. Accordingly, reference to a telecommunication device should not be interpreted as including any particular functionality or operation not described in the present disclosure. Still further, although the present disclosure is described with regard to specific methodologies and frameworks for data collection, traffic management, or handover process, the present disclosure should not be construed to require combination of the disclosed embodiments or any specific variation unless such combination or variation is expressly identified.

With reference now to FIG. 1, a block diagram illustrative of a telecommunication environment 100 will be described. The telecommunication environment 100 can include a traffic management service 140. In an illustrative embodiment, the traffic management service 140 may be utilized to implement one or more traffic management methods and to implement or cause handovers of active communications between cells served by their respective infrastructure equipment.

While the traffic management service 140 is depicted in FIG. 1 as corresponding to a single computing device in the telecommunication communication environment 100, this is illustrative only. The traffic management service 140 may be embodied in a plurality of computing devices, each implementing some functionality of the traffic management service. The computing device (e.g., a server) may include memory, processing unit(s), and computer readable medium drive(s), all of which may communicate with one another by way of a communication bus. The computing device may include network interface(s) that provide connectivity over a wireless communication network 110, a network 130 and/or other networks or computer systems. The processing unit(s) may communicate to and from memory containing program instructions that the processing unit(s) executes in order to operate the traffic management service 140. The memory generally includes RAM, ROM, and/or other persistent and auxiliary memory.

With continued reference to FIG. 1, the telecommunication environment 100 can include a number of telecommunication devices 200, each associated with a user. The telecommunication devices 200 can correspond to a wide variety of devices or components that are capable of initiating, receiving or facilitating communications over a communication network including, but not limited to, personal computing devices, electronic book readers (e.g., e-book readers), hand held computing devices, integrated components for inclusion in computing devices, home electronics, appliances, vehicles, machinery, landline telephones, network-based telephones (e.g., voice over IP ("VoIP"), cordless telephones, cellular telephones, smart phones, modems, personal digital assistants, laptop computers, gaming devices, media devices, and the like. In an illustrative embodiment, the telecommunication devices 200 include a wide variety of software and hardware components for establishing communications over one or more communication networks, including the wireless communication network 110, a wired communication network (not shown), or an IP-based telecommunication network (not shown).

Although the wireless communication network 110 is illustrated as a single communication network, one skilled in the relevant art will appreciate that the communication network can be made up of any number of public or private communication networks and/or network connections. The wireless communication network 110 can include a network of infrastructure equipment 150 located in different geographic locations, each having a defined coverage area. A telecommunication device 200 within a coverage area can connect to the infrastructure equipment 150 and communicate over the wireless communication network 110 in accordance with any one of a number of wireless telecommunication interfaces.

As mentioned above, the telecommunication device 200 may establish or maintain a communication channel with the infrastructure equipment 150. Illustratively, the telecommunication device 200 may have an active communication channel with the wireless communication network 110 (e.g., via a connection with a first infrastructure equipment), such as during a voice call or data session. As will be illustrated with reference to FIG. 2, the telecommunication device 200 may be configured to establish an additional communication channel with the communication network 110 (e.g., via a connection with a second infrastructure equipment) and cause a transition from the previously existing communication channel to the current communication channel, generally referred to as a handover.

In an illustrative embodiment, the telecommunication communication environment 100 can include a number of additional components, systems and/or subsystems for facilitating communications with the telecommunication devices 200, and the traffic management service 140. The additional components can include one or more switching centers 120 for establishing communications with the telecommunication devices 200 via the wireless communication network 110, such as a cellular radio access network incorporating one or more wireless air interface standards promulgated by a standards organization, such as air interface protocols based on code division multiplex access (CDMA), time division multiple access (UEMA), global system for mobile communications (GSM), wireband code division multiplex access (WCDMA), code division multiplex access $3^{rd}$ generation (CDMA2000), time division synchronous code division multiple access (UE-SCDMA), wavelength and time division multiple access (WUEMA), long term evolution (LTE), orthogonal frequency division multiple access (OFDMA), IEEE 802.11 technical standards ("WiFi"), IEEE 802.16 standards ("WiMax"), Unlicensed Mobile Access ("UMA"), General Access Network ("GAN"), or other technologies. The operation of mobile communication networks, such as wireless communication network 110 are well known and will not be described in greater detail. As illustrated in FIG. 1, the switching center 120 also includes interfaces for establishing various communications via the communication network 130, such as the Internet, intranets, private networks and point to point networks, generally referred to as the "network."

Figure 2:
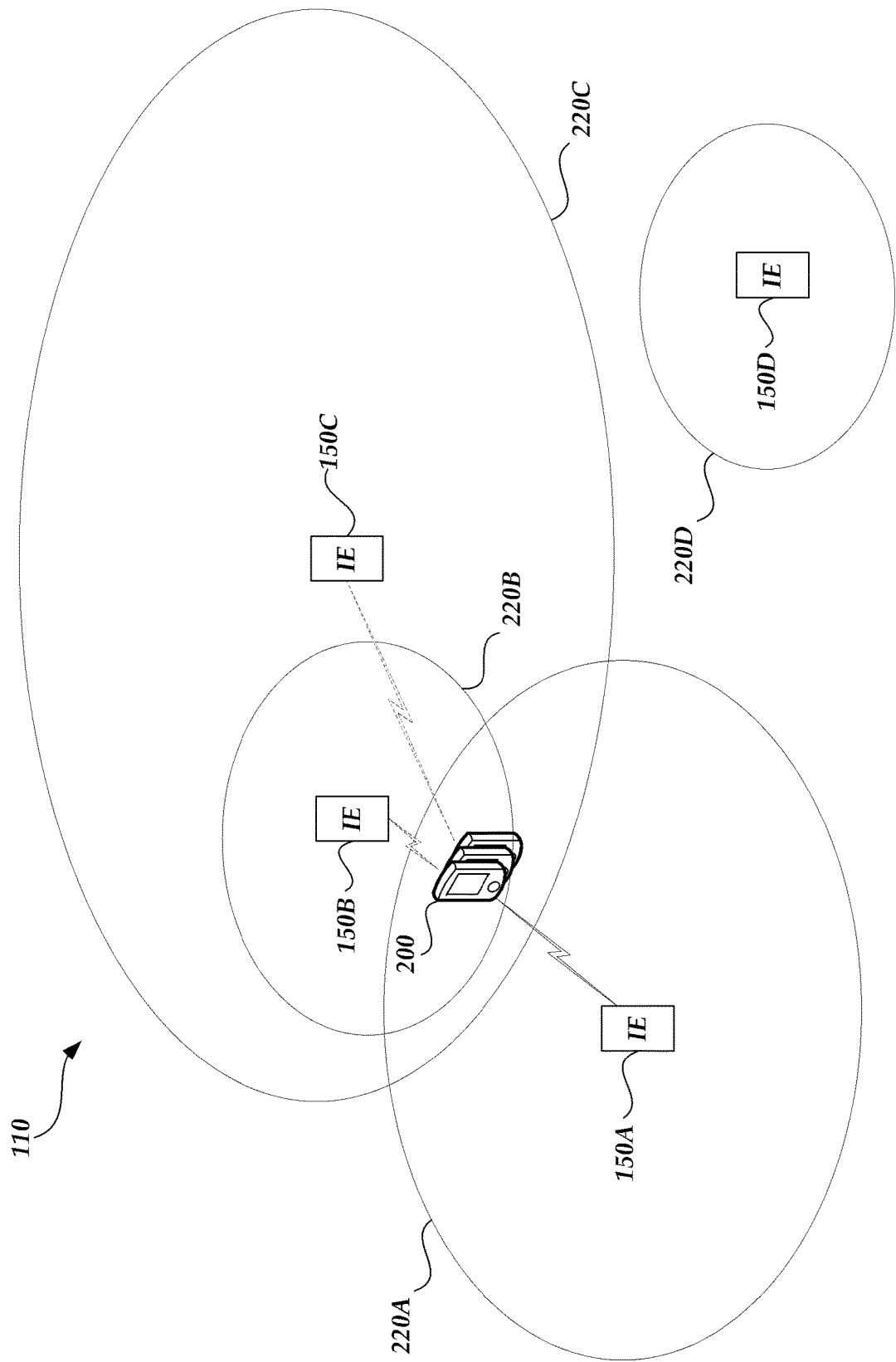
FIG. 2 is an illustrative diagram depicting telecommunication devices and base stations in an illustrative telecommunications environment.

FIG. 2 is an illustrative example of a wireless communication network 110 including several infrastructure equipment 150. As previously discussed, infrastructure equipment 150A, 150B, 150C, and 150D can be associated with their respective coverage areas, such as cells 220A, 220B, 220C, and 220D. The cells 220 may be measured or detected coverage areas based on the placement of the corresponding infrastructure equipment 150 within the wireless communication network 110. In other embodiments, the cells 220 associated with infrastructure equipment 150 may be manually assigned by the wireless communication network service provider, based on manufacturer, type, and the like. The infrastructure equipment 150 is configured to provide communication to a plurality of telecommunication device 200 in the wireless communication network 110. As illustrated in FIG. 2, cell 220A, 220B, and 220C overlaps with one another, while cell 220D covers a separate geographic area. A telecommunication device 200 positioned in the overlapped portion of cells 220A, 220B, and 220C can communicate with infrastructure equipment 150A, 150B, or 150C.

Infrastructure equipment 150 may correspond to a fixed station, which may be referred to as a base station, an access point, a Node B, eNode B, or other type of infrastructure equipment, depending on the nomenclature and implementation of various air interface standards. Accordingly, reference to the terms infrastructure equipment, base station, cell site, Node B, eNode B and the like should not be interpreted as necessarily limited to implementation with a particular air interface standard. Infrastructure equipment can transmit control messages at regular intervals that are directed to all telecommunication devices 200 within the associated cell. The control messages can include information about the base station, its operation, communication protocols or parameters, handover requests or priorities, or the like.

In embodiments in which a telecommunication device 200 is geographically located in overlapping coverage areas of two or more infrastructure equipment 150, the telecommunication device can select or prioritize infrastructure equipment 150 for establishing communication based on various factors, such as signal strength, signal quality, data rate, power level, number of connected users, cell size, etc. With continued reference to FIG. 2, illustratively telecommunication devices 200 have selected infrastructure equipment 150A associated with cell 220A and are in active communication with the wireless network 110 via infrastructure equipment 150A.

In some cases, handovers between cells may occur independent of any congested cell determinations. For example, a telecommunication device 200 may be moving from cell 220A toward cell 220C. Once the signal strength, signal quality, or other factors associated with the connection between the telecommunication device 200 and the infrastructure equipment 150A drops below certain threshold as compared to the infrastructure equipment 150C, the traffic management service 140 or another service associated with the wireless network 110 may implement a handover routine to transfer ongoing communication, such as an ongoing call or data session, from the infrastructure equipment 150A to the infrastructure equipment 150C.

In other cases, the traffic management service 140 may detect or determine that cell 220A is congested, and identify cells 220B and 220C being neighboring cells to cell 220A. The traffic management service 140 may also determine that cell 220B lacks sufficient capacity for offloading traffic from cell 220A, and identify cell 220C as a target cell for traffic offloading from congested cell 220A. The traffic management service 140 may send traffic offloading request to infrastructure equipment 150A, instructing infrastructure equipment 150A to hand over to infrastructure equipment 150C a specified percentage or proportion of ongoing communications with telecommunication devices 200. The congested-cell triggered handovers may be initiated, implemented, or completed while a corresponding telecommunication device 200 either remains substantially stationary (within a threshold distance of a current location) or is moving toward or away from the cell 220C, during an ongoing communication with the wireless communication network 110.

Figure 3:
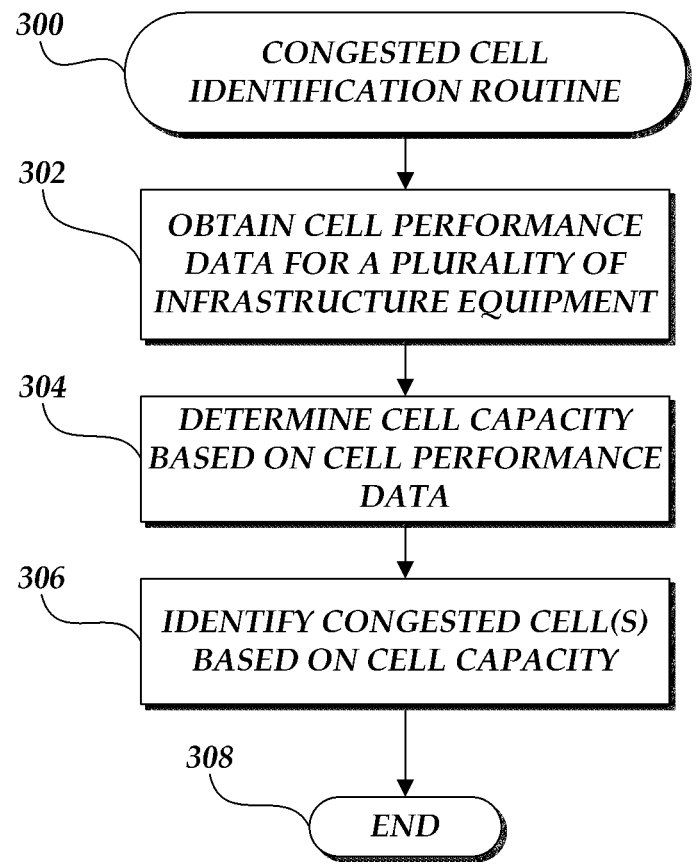
FIG. 3 is a flow diagram depicting an illustrative congested cell identification routine.

FIG. 3 is a flow diagram depicting an illustrative congested cell identification routine 300. Illustratively, the routine 300 may be performed by the traffic management service 140. The routine 300 can be used to identify or detect congested cells in the wireless communication network 110.

At block 302, the traffic management service 140 obtains cell performance data for a plurality of infrastructure equipment 150. As discussed above, the performance data may include performance factors, such as data downloading/uploading volume, data downloading/uploading speed, data throughput rate, number of telecommunication device connections, percentage, or proportion of computing resource utilized, or the like. The performance data may include real time values, aggregate or average values over a period of time (e.g., the most recent hour), other descriptive statistics of the same or the like.

In some embodiments, the traffic management service 140 may be able to request and retrieve the performance data from infrastructure equipment 150 and telecommunication devices 200 in respective cells, for example, via the wireless communication network 110 or network 130. In other embodiments, the traffic management service 140 may obtain the performance data from another performance data collection device or system associated with the wireless communication network 110. As discussed previously, the retrieval of performance data may be in real time or substantially real time.

At block 304, the traffic management service 140 analyzes the performance data and determines cell capacity for each cell associated with various infrastructure equipment 150. Illustratively, the traffic management service 140 may calculate cell capacity in accordance with a defined mathematical formula including one or more performance factors of the performance data. Various weights, conditions, or time decaying factors may be associated with the one or more performance factors and integrated into the mathematical formula. For example, the communication throughput may be assigned a heavier weight than an aggregate data downloading volume due to high error rate of data transfers within certain part of the wireless communication network 110.

In some embodiments, the cell capacity may be expressed as a percentage, a real number, a vector, or a range of values. In some embodiments, the cell capacity computation includes calibration or normalization to ensure that the capacity values for different cells can be compared against one another in a meaningful way. In other embodiments, the cell capacities can be updated or recalculated based on newly obtained cell performance data. The cell capacity updating or recalculation can be performed periodically, on demand, or when triggered by receipt of a threshold quantity of new performance data.

At block 306, the traffic management service 140 identifies one or more congested cells based on their respective cell capacity as determined at block 304. Illustratively, the traffic management service 140 may utilize one or more threshold capacity values for congestion determination. In some embodiments, the threshold capacity values may be pre-determined, for example, by the wireless communication network service provider. Assuming cell capacity is expressed as a percentage of available or unused capacity, the threshold may be a higher value (e.g., 50% available or unused capacity) for off-peak hours and a lower value (e.g., 20% available or unused capacity) for peak hours. In other embodiments, the threshold capacity may be dynamically calculated by the traffic management service 140 based on a distribution of the current or past cell capacities associated with various cells. The traffic management service 140 may compare the cell capacity of each cell against the threshold capacity value. If the unused capacity of a cell falls under the threshold, the cell can be labeled or marked as a congested cell.

In some embodiments, the traffic management service 140 may sort or order the cells into a list in accordance with their respective cell capacities. In these embodiments, a threshold on the ranking of the cells may be utilized to determine congestion. For example, the traffic management service 140 may determine that a threshold number or proportion of cells with the lowest unused cell capacities in the ordered list are congested. The threshold number or proportion may be predetermined by the wireless communication network service provider or dynamically calculated by the traffic management service 140 based on a distribution of the current or past cell capacities associated with various cells. The routine 300 ends at block 308. Depending on the implementation, the routine 300 can be implemented to occur continuously, periodically, and/or based on the occurrence of specific events, such as a drop in quality of service measures for one or more cells.

Figure 4:
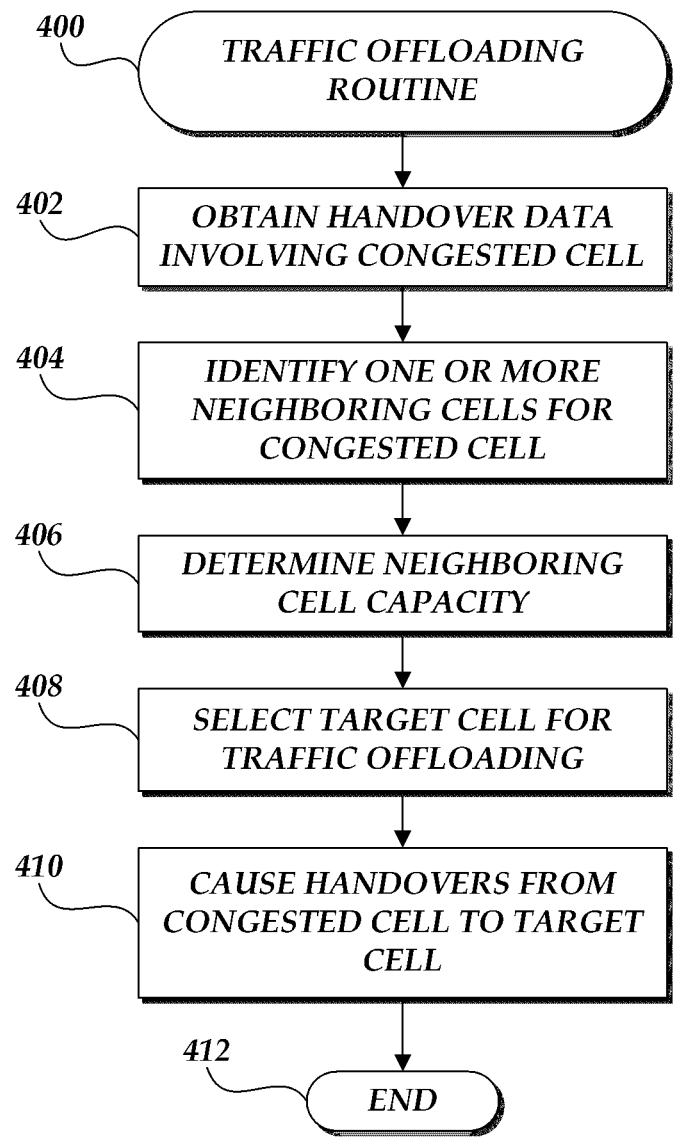
FIG. 4 is a flow diagram depicting an illustrative traffic offloading routine.

FIG. 4 is a flow diagram depicting an illustrative traffic offloading routine 400. Illustratively, the routine 400 may be performed by the traffic management service 140. The routine 400 can be used to identify appropriate neighboring cells for individual congested cells and cause transfer or handover of active communication channel(s), such as ongoing call or data session with telecommunication device(s) 200, from a source infrastructure equipment 150 associated with the congested cell to a target infrastructure equipment 150 associated with an identified neighboring cell with sufficient capacity.

At block 402, for each congested cell (e.g., congested cell identified by routine 300), the traffic management service 140 obtains data regarding past or ongoing handovers that involve the congested cell. The handover data may include quantities of attempted or completed handovers of active communication channels from the congested cell and one or more other cells, or from one or more other cells to the congested cell. The handover data may also include information regarding the relative locations of cells involved in the handovers, orientations of associated infrastructure equipment 150, handover success rate, the speed, acceleration or direction associated with telecommunication devices 200, the power level, bit rate, signal quality, signal strength, number of connected telecommunication devices, or other operational characteristics of associated infrastructure 150, etc. The handover data may include real time values, aggregate or average values over a period of time (e.g., the most recent day or hour), other descriptive statistics of the same or the like.

In some embodiments, the traffic management service 140 may be able to request and retrieve the handover data from infrastructure equipment 150 and telecommunication devices 200 in respective cells, for example, via the wireless communication network 110 or network 130. In other embodiments, the traffic management service 140 may obtain the handover data from another handover data collection device or system associated with the wireless communication network 110. In some embodiments, the retrieval of handover data may be in real time or substantially real time.

At block 404, the traffic management service 140 identifies one or more neighboring cells for the congested cell based on an analysis of the handover data. Because handovers typically occur within some overlapping coverage area of two or more cells, the traffic management service 140 may process the handover data and identify neighboring cells for the congested cell. Illustratively, the traffic management service 140 may identify all cells that have had a threshold number of attempted or actual handovers from or to the congested cell, that are within a threshold distance from the congested cell, that provide same or similar bit rate, signal quality, signal strength as the congested cell, that satisfy a combination (weighted or unweighted) of the same criteria or the like.

At block 406, the traffic management service 140 determines the cell capacity for the identified neighboring cells. This can be accomplished in a way similar to block 304 of routine 300. As discussed above, the traffic management service 140 analyzes the performance data associated with the identified neighboring cells and determines their cell capacity. Illustratively, the traffic management service 140 may calculate cell capacity in accordance with a defined mathematical formula including one or more performance factors of the performance data. Various weights, conditions, or time decaying factors may be associated with the one or more performance factors and integrated into the mathematical formula. For example, the data downloading/uploading volume may be assigned a heavier weight than the number of telecommunication device connections due to the heavy presence of smart phones running data-dependent apps.

In some embodiments, the cell capacity may be expressed as a percentage, a real number, a vector, or a range of values. In some embodiments, the cell capacity computation includes calibration or normalization to ensure that the capacity values for different cells can be compared against one another in a meaningful way. In other embodiments, the cell capacities can be updated or recalculated based on newly obtained cell performance data. The cell capacity updating or recalculation can be performed periodically, on demand, or when triggered by receipt of a threshold quantity of new performance data.

At block 408, the traffic management service 140 selects one or more target cells from the identified neighboring cells for offloading traffic from the congested cell. Illustratively, the traffic management service 140 may utilize one or more threshold capacity values for the target cell determination. The threshold capacity for determining target cells may or may not be the same as the threshold capacity for determining congested cells as in routine 300. For example, the threshold capacity (in terms of available or unused capacity) for target cell determination may be higher than for congested cell determination to ensure sufficient cushion capacity in a target cell for traffic offloading.

In some embodiments, the threshold capacity values may be pre-determined, for example, by the wireless communication network service provider. Assuming cell capacity is expressed as a percentage of available or unused capacity, the threshold may be a higher value (e.g., 70% available or unused capacity) for off-peak hours and a lower value (e.g., 40% available or unused capacity) for peak hours. In other embodiments, the threshold capacity may be dynamically calculated by the traffic management service 140 based on a distribution of the current or past cell capacities associated with various cells. The traffic management service 140 may compare the cell capacity of each identified neighboring cell against the threshold capacity value. If the unused capacity of an identified neighboring cell exceeds the threshold, the neighboring cell can be labeled or marked as a target cell for offloading traffic from the congested cell.

In some embodiments, the traffic management service 140 may sort or order the neighboring cells into a list in accordance with their respective cell capacities. In these embodiments, a threshold on the ranking the neighboring cells may be utilized to determine target cells. For example, the traffic management service 140 may determine that a threshold number or proportion of neighboring cells with the highest unused capacities in the ordered list are target cells. The threshold number or proportion may be predetermined by the wireless communication network service provider or dynamically calculated by the traffic management service 140 based on a distribution of the current or past cell capacities associated with various cells.

In further embodiments, the traffic management service 140 may apply a distribution model (e.g., uniform distribution of traffic among cells) to adjust or prioritize target cells for individual congested cells. For example, in order for the traffic to conform or converge to a uniform distribution, the traffic management service 140 may analyze the overlaps of target cells for different congested cells (e.g., a target cell may need to absorb traffic offloaded from multiple congested cells), and apportion or prioritize the target cells that are associated with multiple congested cells to avoid double counting cell capacities for these target cells. Additionally, the traffic management service 140 may assign a weight or probability to each (congested cell, target cell) pair based on respective congested cell and target cell capacities to effect a balanced or controlled traffic offloading from the congested cells to different target cells.

At block 410, the traffic management service 140 implements or causes handovers of active communication channels from congested cell(s) to target cell(s). Illustratively, the traffic management service 140 may send requests or instructions to infrastructure equipment 150 associated with the congested cells (and in some cases, the target cells) or to the telecommunication devices inside the congested cells. Such requests or instructions may initiate, implement, or otherwise cause handovers to balance traffic in at least a portion of the wireless communication network 110. The requests or instructions may identify the congested cell(s), corresponding target cell(s), handover timing or conditions, weight or probability associated with applicable (congested cell, target cell) pairs, combination of the same or the like.

In some embodiments, the requests or instructions may specify or cause mobility parameter changes in various network protocols, network layers, network interfaces, or other telecommunication architecture involved in handover implementations. In some embodiments, a handover includes transferring of ongoing communication, such as an ongoing call or data session from a telecommunication device, from an infrastructure equipment 150 associated with the congested cell to an infrastructure equipment 150 associated with the target cell. In other embodiments, a handover includes identifying idling telecommunication device(s) in the congested cell, and in response to a communication request from the identified telecommunication device within a threshold period of time, causing establishment of a communication channel with the identified telecommunication device via the target cell. The routine 400 ends at block 412. Depending on the implementation, the routine 400 can be implemented to occur continuously, periodically, and/or based on the occurrence of specific events, such as the detection of significant traffic imbalance within some portion of the wireless communication network.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware (e.g., application-specific logic circuitry), computer software executed by hardware, or combinations of both. To clearly illustrate this interchangeability of hardware and software, various illustrative components, blocks, modules, and steps have been described above generally in terms of their functionality. Whether such functionality is implemented as hardware, or as software executed by hardware, depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a computing device, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method for balancing traffic in a wireless telecommunication network associated with a plurality of cells, the method comprising:
   determining a measure of unused capacity for each cell of the plurality of cells;
   identifying at least one congested cell from the plurality of cells based, at least in part, on a comparison of a first threshold capacity with the measure of unused capacity for each cell of the plurality of cells;
   identifying a subset of neighboring cells for the at least one congested cell, wherein each neighboring cell shares at least a portion of geographic coverage area with the at least one congested cell and each neighboring cell meets or exceeds a threshold number of attempted or actual handovers with the at least one congested cell, is within a threshold distance from the at least one congested cell, and provides a same or similar bitrate, signal quality, and signal strength as the at least one congested cell;
   selecting at least one target cell from the subset of neighboring cells for offloading traffic from the at least one congested cell based, at least in part, on a comparison of a second threshold capacity with a measure of unused capacity for each cell of the subset of neighboring cells, wherein the second threshold capacity is higher than the first threshold capacity to ensure cushion capacity in the at least one target cell for traffic offloading; and
   causing handover of active communication channels established by telecommunication devices from the at least one congested cell to the at least one target cell.

2. The computer-implemented method of claim 1, wherein the measure of unused capacity corresponds to a percentage, a real number, a vector, or a range of values.

3. The computer-implemented method of claim 1, wherein determining the measure of unused capacity comprises obtaining performance data for each cell of the plurality of cells, wherein the performance data includes at least one of data downloading volume, data downloading speed, data throughput rate, number of telecommunication device connections, or percentage of computing resource utilized.

4. The computer-implemented method of claim 3, wherein determining the measure of unused capacity further comprises determining the measure of unused capacity in accordance with a defined mathematical formula including one or more performance factors of the performance data.

5. The computer-implemented method of claim 1, wherein the first threshold capacity is predetermined by a provider of the wireless telecommunication network.

6. The computer-implemented method of claim 1, wherein identifying the subset of neighboring cells for the at least one congested cell comprises analyzing past handovers between the at least one congested cell and remaining cells of the plurality of cells.

7. The computer-implemented method of claim 1, wherein each cell of the plurality of cells is associated with an infrastructure equipment.

8. The computer-implemented method of claim 7, wherein causing handover of active communication channels established by telecommunication devices from the at least one congested cell to the at least one target cell comprises sending at least one handover request to the infrastructure equipment associated with the at least one congested cell.

9. The computer-implemented method of claim 1, wherein the first threshold capacity varies between peak and non-peak communication hours.

10. The computer-implemented method of claim 1, wherein the first threshold capacity is dynamically calculated based on a distribution of current or past cell capacities.

11. The computer-implemented method of claim 1, wherein identifying the at least one congested cell comprises determining that the unused capacity for at least one cell from the plurality of cells falls under the first threshold capacity.

12. The computer-implemented method of claim 1, wherein selecting the at least one target cell from the subset of neighboring cells comprises determining that the unused capacity for at least one target cell from the subset of neighboring cells exceeds the second threshold capacity.

13. A non-transitory computer-readable medium storing computer-executable instructions that, when executed by a processor, causes the processor to perform operations comprising:
   identifying a first congested cell from a plurality of cells associated with a wireless communication network, wherein identifying the first congested cell comprises identifying the first congested cell based, at least in part, on a comparison of a first threshold capacity with a measure of unused capacity for each cell of the plurality of cells, wherein the comparison comprises a determination that the measure of unused capacity for a cell from the plurality of cells falls under the first threshold capacity;

identifying a first subset of neighboring cells for the first congested cell, wherein each neighboring cell of the first subset of neighboring cells shares at least a portion of geographic coverage area with the first congested cell and each neighboring cell meets or exceeds a threshold number of attempted or actual handovers with the first congested cell, is within a threshold distance from the first congested cell, and provides a same or similar bitrate, signal quality, and signal strength as the first congested cell;

selecting a first target cell from the first subset of neighboring cells for offloading traffic from the first congested cell based, at least in part, on a measure of unused capacity for each neighboring cell of the first subset of neighboring cells, wherein selecting the first target cell from the first subset of neighboring cells comprises selecting the first target cell based, at least in part, on the first target cell exceeding a second threshold capacity different from the first threshold capacity;

causing handover of active communication channels established by telecommunication devices from the first congested cell to the first target cell;

identifying a second congested cell from the plurality of cells;

identifying a second subset of neighboring cells for the second congested cell; and selecting a second target cell from the second subset of neighboring cells for offloading traffic from the second congested cell; and assigning a first weight for offloading traffic from the first congested cell to the first target cell and assigning a second weight for offloading traffic from the second congested cell to the second target cell, wherein the first subset of neighboring cells overlap with the second subset of neighboring cells and the first target cell and the second target cell correspond to a same target cell.

14. The non-transitory computer-readable medium of claim 13, wherein causing handover of active communication channels comprises causing handover of active communication channels from the first congested cell to the first target cell in accordance with the first weight.

15. The non-transitory computer-readable medium of claim 13, wherein the operations further comprise causing handover of active communication channels established by telecommunication devices from the second congested cell to the second target cell in accordance with the second weight.

16. A system comprising a computing device in communication with one or more switching centers associated with a wireless communication network, the computing device configured to:

identify a congested cell from a plurality of cells associated with the wireless communication network, wherein identifying the congested cell comprises identifying the congested cell based, at least in part, on a comparison of a first threshold capacity with a measure of unused capacity for each cell of the plurality of cells, wherein the comparison comprises a determination that the measure of unused capacity for a cell from the plurality of cells falls under the first threshold capacity;

identify a subset of neighboring cells for the congested cell, wherein each neighboring cell shares at least a portion of geographic coverage area with the congested cell and each neighboring cell meets or exceeds a threshold number of attempted or actual handovers with the congested cell, is within a threshold distance from the congested cell, and provides a same or similar bitrate, signal quality, and signal strength as the congested cell;

generating a ranking of the subset of neighboring cells based at least in part on a measure of unused capacity for each neighboring cell of the subset of neighboring cells;

select a target cell from the subset of neighboring cells for offloading traffic from the congested cell based, at least in part, on the ranking of the subset of neighboring cells and on a determination that the measure of unused capacity of the target cell exceeds a second threshold capacity; and causing handover of active communication channel established by at least one telecommunication device from the congested cell to the target cell.

17. The system of claim 16, wherein the at least one telecommunication device remains within a threshold distance of a current location.

18. The system of claim 16, wherein the computing device is further configured to apply a distribution model to the selection of the target cell.

* * * * *